Patented May 30, 1933

1,911,332

UNITED STATES PATENT OFFICE

KURT WARNAT, OF BASEL, SWITZERLAND, ASSIGNOR TO HOFFMANN-LA ROCHE INC., OF NUTLEY, NEW JERSEY, A CORPORATION OF NEW JERSEY

AMINOKETOALCOHOL AND PROCESS FOR THE MANUFACTURE OF SAME

No Drawing. Application filed December 30, 1930, Serial No. 505,671, and in Germany January 18, 1930.

It has been found, that aminoalcohols readily react with α-halogenketones forming aminoketoalcohols. By aminoketoalcohols are understood compounds in which the nitrogen atom, which is not connected to a benzene ring, carries an alkyl radical and two aralkyl radicals, of which latter one contains an aliphatic keto group and the other an aliphatic hydroxyl group. The following equation illustrates the reaction between ephedrine and 1-phenyl-1-oxo-2-brompropane (α-brompropiophenone) according to Example 1:

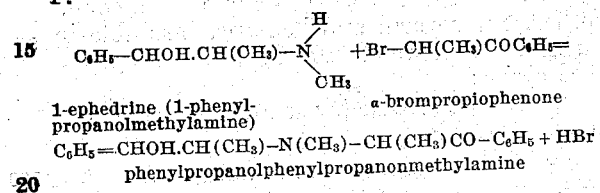

1-ephedrine (1-phenyl-propanolmethylamine)   α-brompropiophenone $C_6H_5$=CHOH.CH(CH$_3$)-N(CH$_3$)-CH(CH$_3$)CO-C$_6$H$_5$ + HBr
phenylpropanolphenylpropanonmethylamine The transformation is carried out by using an excess of the aminoalcohol. Instead of using an excess of the aminoalcohol, the condensation may be carried out with the aid of alkali.

The new compounds are easily soluble in the usual organic solvents, for instance alcohol, ether, benzene, chloroform; in water they are insoluble. With acids they mostly form well crystallized salts which are soluble in water. Most of the new compounds have a decided action on the respiratory centre.

The new compounds are to be used as such for therapeutic purposes or as intermediates for the manufacture of pharmaceutical preparations.

Example 1

16 parts of l-phedrine are boiled in 80 parts of benzene with 12 parts of 1-phenyl-1-oxo-2-brompropane (α-brompropiophenone) for 5 hours. Without removing the precipitated ephedrine salt the reaction-mixture is then treated with an acid, made alkaline and exhaustively extracted with ether. The unchanged ephedrine is removed by vacuum distillation and the residue recrystallized from methyl alcohol. The condensation-product thus obtained is soluble in ether, benzene, alcohol and chloroform; it is insoluble in water and melts at 92–93° C. It is optically inactive.
The hydrochloride is exceedingly soluble in water, very easily soluble in alcohol, and melts at 194° C.

Example 2

36 parts of d-pseudo-ephedrine are boiled in 150 parts of benzene with 23 parts of α-brompropiophenone for 5 hours and the precipitated pseudo-ephedrine is removed. The reaction-product is then acidified with a little hydrochloric acid, whereby the hydrochloride of the condesation-product is precipitated as crystals. These are removed and recrystallized from water, in which they are rather difficultly soluble. Melting point 206° C. $[\alpha]_D^{20} = -12.6°$.
The base is easily soluble in benzene, alcohol and chloroform, insoluble in water and melts at 156° C.

Example 3

33 parts of l-ephedrine base are boiled in 100 parts of benzene and 100 parts of water with 43 parts of α-brompropiophenone and a concentrated aqueous solution of 12 parts of potassium hydroxide is added. The boiling is continued for 3 to 4 hours, the bases are taken up in acid and, while cooling, made alkaline with a solution of sodium hydroxide. An oil is separated from the reaction-product. It is dissolved in hot methyl alcohol; on cooling, the crystalline condensation-product is precipitated in good yield. The compound melts at 126° C.; it is easily soluble in chloroform and ether, insoluble in water. The hydrochloride is very easily soluble in water and melts at 192–193° C. The specific rotation of its aqueous solution is $[\alpha]_D^{20} = +93°$. In the mother liquors a little of the racemic compound of melting point 92–93° C. and some unchanged ephedrine are found, the latter is recovered by vacuum distillation. 28 parts of the optically active condensation-product and 3 parts of the racemic compound were obtained, while 7 parts of unchanged l-ephedrine were recovered.

Example 4

33 parts of d-pseudo-ephedrine base are heated in 100 parts of benzene and 100 parts of water with 43 parts of α-brompropiophenone and a concentrated aqueous solution of 8 parts of sodium hydroxide is added. The boiling is continued for 3 hours. On acidifying with hydrochloric acid, considerable quantities of the difficultly soluble hydrochloride of the condensation-product melting at 206° C., which is described in Example 2, are precipitated for purification it is recrystallized from water. The yield is 45 parts of the hydrochloride. The specific rotation of the hydrochloride is $[\alpha]_D^{20} = -12{,}6°$.

Example 5

17 parts of l-ephedrine base with the addition of 6 parts of sodium carbonate are boiled with 22 parts of α-brompropiophenone in 300 parts of benzene for 4 hours. The bases are then taken up with acid, made alkaline with a solution of sodium hydroxide and the precipitated oil is crystallized from methyl alcohol. The optically active compound melting at 126° C., which is described in Example 3, is obtained; the yield is 10 parts.

Example 6

5 parts of d,l-ephedrine hydrochloride, 5 parts of α-bromacetophenone, 2.8 parts of potassium hydroxide are shaken in 20 parts of water and 20 parts of benzene, whereupon reaction sets in with evolution of heat. The boiling is continued for an hour, the product shaken with ether and hydrochloric acid and the base precipitated by a solution of sodium hydroxide from the hydrochloric acid solution. The base is recrystallized from methyl alcohol and melts at 76° C. It is easily soluble in ether and benzene.
The hydrochloride melts at 146° C. and is easily soluble in water.

Example 7

5 parts of l-ephedrine hydrochloride are boiled in 20 parts of water and 20 parts of benzene with 5.5 parts of α-brombutyrophenone and 2.8 parts of potassium hydroxide. The bases are then taken up with dilute hydrochloric acid, precipitated with ammonia, again dissolved in dilute hydrochloric acid and once more precipitated by ammonia. The precipitate is dissolved in ether and the solution dried. The residue from the ether is dissolved in the calculated quantity of dilute hydrochlorid acid, thus obtaining a solution of the hydrochloride of the condensation-product. The base itself is an oil.

Example 8

3 parts of β-phenylethanolmethylamine, 1.2 parts of potassium hydroxide and 4 parts of α-bromacetophenone are shaken with 20 parts of benzene and 10 parts of water, whereupon reaction sets in with evolution of heat. To complete the reaction boiling is continued for half an hour and the bases are then extracted with dilute hydrochloric acid. The hydrochloric acid solution is several times shaken with ether and the condensation-product precipitated with a solution of sodium hydroxide. The product is washed with water and dissolved in warm dilute hydrochloric acid. On cooling the hydrochloride of the new compound crystallizes from the solution. It melts at 167–168° C., after sintering at 100° C. The base is easily soluble in alcohol, ether, benzene and chloroform; it is insoluble in water and melts at 80° C.

Example 9

4 parts of β-phenylethanolmethylamine hydrochloride are boiled with 2.4 parts of potassium hydroxide and 4.5 parts of α-brompropiophenone in 10 parts of water and 10 parts of benzene for 4 hours. It is worked up in the same manner as in Example 8. The hydrochloride of the new compound is recrystallized from water. It melts at 177° C. The base is easily soluble in alcohol, ether, chloroform and benzene, insoluble in water, and melts at 110° C.

I claim:

1. As new products the aminoketoalcohols of the formula

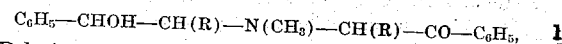

R being hydrogen or alkyl; the new products being readily soluble in alcohol, ether, benzene, and chloroform, but insoluble in water; the compounds forming with acids well crystallized water soluble salts, having in general a decided action on the respiratory center.

2. As new products the ephedrine derivatives of the formula

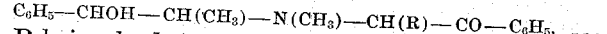

R being hydrogen or alkyl, the new products being easily soluble in alcohol, ether, benzene, and chloroform, but insoluble in water; the compounds forming with acids well crystallized water soluble salts, having in general a decided action on the respiratory center.

3. As new products the ephedrine derivatives of the formula

the new products being easily soluble in alcohol, ether, benzene and chloroform, but insoluble in water; the compounds forming with acids well crystallized water soluble salts, having in general a decided action on the respiratory center.

4. N-α-benzoylethyl-1-ephedrine having the formula

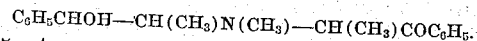

5. A process for the manufacture of N-aryl-alkylol-N-arylalkylone amines which consists in condensing a substance selected from the group consisting of α phenyl ethanol methyl amine and β phenyl ethanol methyl amine with a compound of the following general type $$Br-CHR-CO-C_6H_5$$

where R represents hydrogen or a hydrocarbon radical of the lower aliphatic series.

6. A process for the manufacture of N-aryl-alkylol-N-aryalkylone amines which consists in condensing a substance selected from the group consisting of α phenyl ethanol methyl amine and β phenyl ethanol methyl amine with a compound of the following general type $$Br-CHR-CO-C_6H_5$$

where R represents hydrogen or a hydrocarbon radical of the lower aliphatic series, in the presence of alkali.

7. A process for the manufacture of ephedrine N-acyl phenones, which consists in condensing ephedrine with a compound of the following general type $$Br-CHR-CO-C_6H_5$$

where R represents hydrogen or a hydrocarbon radical of the lower aliphatic series.

8. A process for the manufacture of ephedrine N-acyl phenones, which consists in condensing ephedrine with a compound of the following general type $$Br-CHR-CO-C_6H_5$$

where R represents hydrogen or a hydrocarbon radical of the lower aliphatic series, in the presence of alkali.

9. A process for the manufacture of ephedrine N-propiophenone which consists in condensing ephedrine with α brompropiophenone.

10. A process for the manufacture of ephedrine N-propiophenone which consists in condensing ephedrine with α brompropiophenone in the presence of alkali.

11. Process for the manufacture of phenylpropanolphenylpropanonmethylamine, which consists in condensing l-ephedrine with α-brompropiophenone.

12. Process for the manufacture of l-phenylpropanolphenylpropanonmethylamine, which consists in condensing l-ephedrine with α-brompropiophenone in the presence of alkali.

In witness whereof I have hereunto set my hand.

KURT WARNAT.